US011507919B1

(12) United States Patent
Colucci et al.

(10) Patent No.: US 11,507,919 B1
(45) Date of Patent: Nov. 22, 2022

(54) SMART CONTAINER

(71) Applicant: Amazon Technologies, Inc., Seattle, WA (US)

(72) Inventors: John Lewis Colucci, Seattle, WA (US); Zhongkai Chen, Sammamish, WA (US); Gaurav Kumar, Bellevue, WA (US); Jinxue Zhou, Bellevue, WA (US); Travis Solin, Helmsange (LU)

(73) Assignee: Amazon Technologies, Inc., Seattle, WA (US)

( * ) Notice: Subject to any disclaimer, the term of this patent is extended or adjusted under 35 U.S.C. 154(b) by 97 days.

(21) Appl. No.: 16/787,802

(22) Filed: Feb. 11, 2020

(51) Int. Cl.
*G06Q 10/08* (2012.01)
*H02J 7/00* (2006.01)
*G06K 19/07* (2006.01)
*G06K 7/10* (2006.01)

(52) U.S. Cl.
CPC ....... *G06Q 10/087* (2013.01); *G06K 7/10297* (2013.01); *G06K 19/0723* (2013.01); *H02J 7/0013* (2013.01)

(58) Field of Classification Search
CPC ............. G06Q 10/087; G06K 19/0723; G06K 7/10297; H02J 7/0013
See application file for complete search history.

(56) References Cited

U.S. PATENT DOCUMENTS

| | | | | |
|---|---|---|---|---|
| 9,928,698 | B2* | 3/2018 | Farrow | G06Q 10/087 |
| 10,032,342 | B1* | 7/2018 | Foina | G06Q 10/087 |
| 11,080,653 | B2* | 8/2021 | Elazary | G06Q 10/06316 |
| 2005/0083213 | A1* | 4/2005 | Stevens | G06Q 10/08 340/994 |
| 2005/0149226 | A1* | 7/2005 | Stevens | B65G 1/1371 700/214 |
| 2010/0033330 | A1* | 2/2010 | Waterhouse | G08B 13/2402 340/572.1 |
| 2015/0262195 | A1* | 9/2015 | Bergdale | G07C 9/29 705/5 |
| 2020/0381924 | A1* | 12/2020 | Lagnado | G06F 1/26 |
| 2021/0165979 | A1* | 6/2021 | Wilkinson | G06Q 10/0833 |

* cited by examiner

*Primary Examiner* — Sonji N Johnson
(74) *Attorney, Agent, or Firm* — Patterson + Sheridan, LLP

(57) ABSTRACT

A smart container for facilitating operations in a facility is provided. The smart container includes an apparatus configured to store and transport one or more items, one or more electronic devices disposed one or more sides on the apparatus, and a wheel-based charging system coupled to the apparatus and configured to charge one or more battery packs for the one or more electronic devices. The one or more electronic devices are configured to transmit information for monitoring and tracking a position of the smart container throughout an environment.

20 Claims, 10 Drawing Sheets

SMART CONTAINER

BACKGROUND

The present invention relates to an intelligent container for facilitating facility operations (or processes).

Many facilities (e.g., warehouses, plants, distribution centers, storehouses, factories, etc.) perform tasks such as storing items, sorting items, packaging items, shipping items, and the like. Such facilities generally use various transport devices (e.g., carts, containers, pallets, bins, etc.) to transport items to different locations inside and/or outside the facility. As an example, an associate may retrieve items from storage and use a cart to transport the items to a location in preparation for shipping. In another example, an associate can load items onto a cart from a loading dock and transport the items to a storage location in the facility. In some cases, the items may be stored in larger containers. These containers can be transitioned throughout the facility on carts or on other transport devices.

BRIEF DESCRIPTION OF DRAWINGS

Various embodiments in accordance with the present disclosure will be described with reference to the drawings, where like designations denote like elements.

DETAILED DESCRIPTION

Figure 1:
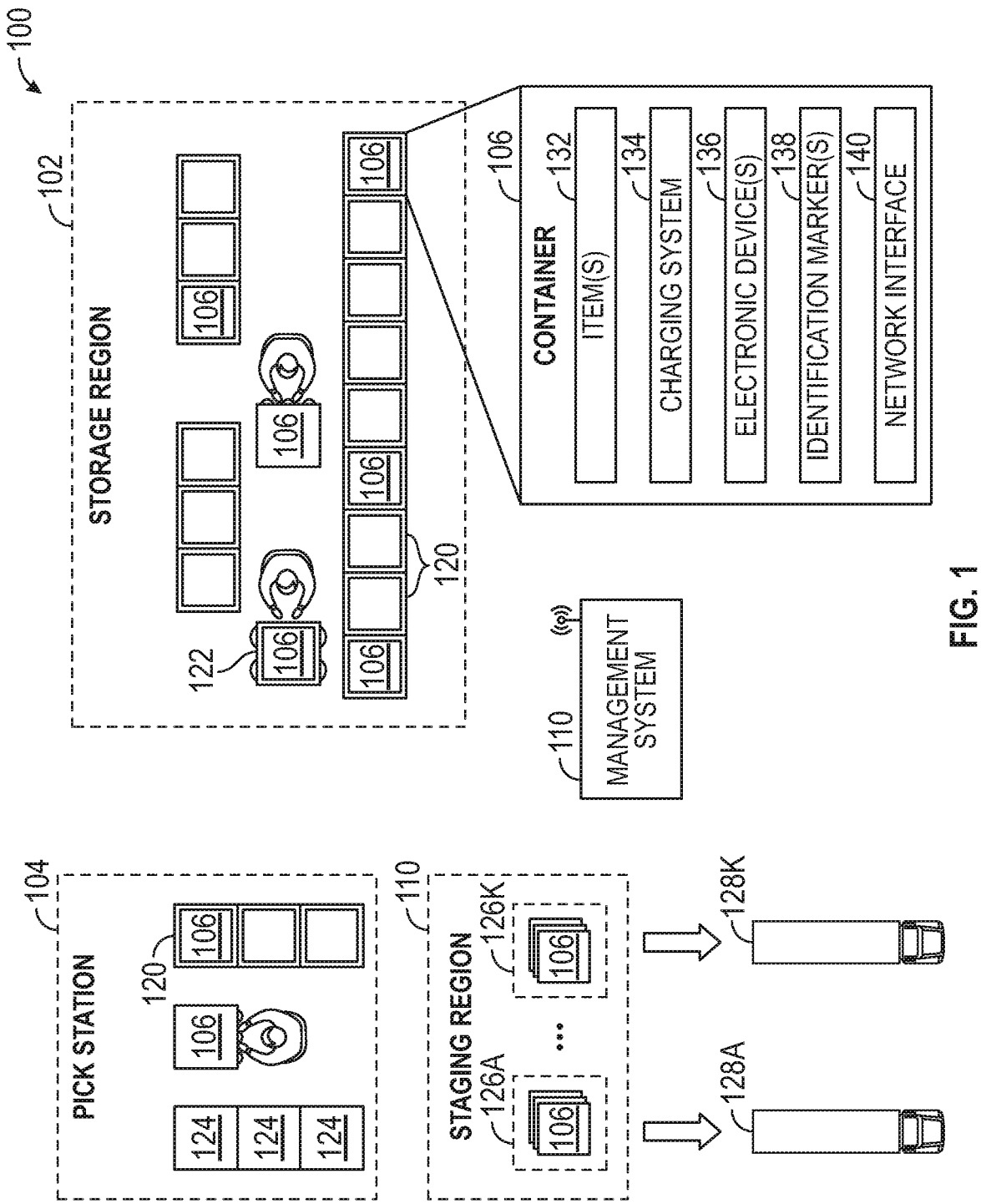
FIG. 1 illustrates an example facility with multiple regions and containers used to transition items about the regions, according to one embodiment.

Inventory systems are utilized by many entities for storing and managing inventory. For example, some retailers may utilize a warehouse of racks that store inventory items in various bins. When an order for a specific inventory item needs to be filled by the retailer, an associate typically retrieves the inventory item from the bin where the inventory item is stored.

Inventory systems according to one embodiment described herein may utilize containers (also referred to as transport vehicles or container devices) to aid in storing and transporting items within and outside a facility. For example, in some example operations, the items may be retrieved from inventory and sorted into containers. When a customer order is ready for processing (e.g., for shipping), the container associated with the customer order can be located (or picked) and transitioned into a staging area. From the staging area, the container(s) may be loaded into a delivery vehicle and transported to a delivery location. Once a given container has reached its delivery location, the container can be unloaded from the delivery vehicle and items can be unloaded from the containers. The empty container(s) may then be reloaded into the delivery vehicle and transported back to the facility.

As the number of containers in use by a facility increases, it can be time consuming and inefficient to manage the use of the containers. For example, with a large number of containers, it can be difficult to keep track of where a given container is at any given point in time. In some cases, for example, a container can get misplaced inside or outside of the facility. In some cases, a container may be misidentified and inadvertently transported to an incorrect delivery location. In yet other cases, it can be difficult to identify and locate the particular container that includes items associated with a high priority customer order (e.g., a customer order due to be shipped within a predefined amount of time).

Accordingly, embodiments herein describe a smart container for facilitating facility operations. In one particular embodiment described in more detail below, the smart container includes one or more electronic devices, which provide enhanced processing capability for facility operations (e.g., relative to conventional containers). The smart containers can incorporate multiple layers of tracking and visual technologies, allowing for the smart containers to be monitored and tracked in real-time. This in turn can enable faster processing in the facility with improved container visibility and traceability. Further, in some embodiments described in more detail below, the smart containers can be equipped with a wheel-based generator assembly for charging the electronic devices on the smart container. For example, the wheel-based generator assembly can be configured to convert the mechanical motion of the container (e.g., as it is being moved throughout the facility and/or outside the facility) into electrical energy, which can be used to charge one or more electronic devices on the container. This charging process can reduce the amount of time associated with maintaining devices on the container.

Note that while many of the following embodiments use a fulfillment center as a reference example of an environment in which the smart containers described herein can be used, embodiments are not limited to such facilities. For example, the smart containers described herein can be used for other types of facilities (e.g., retail stores, grocery stores, sorting centers, delivery stations, mobile delivery facilities, etc.). Further, in some embodiments, the smart containers described herein can be used in delivery vehicles (e.g., trucks, vans, trailers, etc.).

FIG. 1 illustrates an example inventory system 100 with multiple regions and containers used to transition items about the regions, according to one embodiment. The inventory system 100 may be arranged in a facility or warehouse (e.g., distribution facility, fulfillment center, etc.) that is logically organized into areas or regions associated with various functions. In this depicted example, the facility includes a storage region 102, a pick station 104, and a staging region 110. Note, however, that depending upon the size of the inventory system 100, the facility may hold more than one of the storage region 102, the pick station 104, and the staging region 110, or the facility may be configured without the storage region 102, the pick station 104, or the staging region 110. Other examples of suitable facility operations may include transporting to different areas in the facility, sorting operations, loading on/off transport vehicles 128, and so forth.

Within the storage region 102, the inventory system 100 includes one or more inventory holders 120 for storing containers 106 and one or more carts 122 for transporting the containers 106. Note that only some of the inventory holders 120 and containers 106 are shown referenced with "120" and "106," respectively, for ease of illustration. Each inventory holder 120 may be implemented as a physical structure to hold one or more containers 106 (with inventory items) and/or inventory item(s) without a container 106. In one embodiment, the inventory holders 120 may be entire racks of shelves, which each shelf providing a location for one or more containers 106. The inventory holder 120 has a physical length, width, and height that may be standardized or varied within the inventory system 100. In general, the inventory holders 120 may be configured to hold essentially any type or size of item or be used for any number of purposes, including, but not limited to, carrying pallets, storing shipping supplies, holding garbage, supporting empty boxes, supporting filled containers with items once orders are fulfilled, and so on. Additionally, as used herein, inventory holders 120 can include holders for other types of products or items and hence include order holders.

In some cases, one or more containers 106 and/or individual items can be transported throughout the facility via a cart 122. The cart 122 may include a set of wheels, which allow the cart 122 to move in all directions. In some cases, the cart 122 may be a manual or hand-propelled transport device that can move about the facility, e.g., under the direction of an associate. In other cases, the cart 122 may be a self-powered device (e.g., a mobile drive unit) that may move freely about the facility, under its own direction or through coordination by a management system (e.g., management system 110).

The pick station 104 is designed with multiple locations 124 to accommodate one or more inventory holders 120. In the depicted example, a line of three pick locations 124 is shown next to a set of inventory holders 120. Here, containers 106 (or items, in general) from one or more of the pick locations 124 may be transferred into one of the inventor holders 120, and vice versa. In another example, containers 106 from one or more of the inventory holders 120 and/or the pick locations 124 can be transferred onto a cart 122 (not shown), and vice versa. In yet another example, individual containers 106 may be picked from an inventory holder 120 and transported themselves (e.g., without a cart 122) throughout the facility.

The staging region 110 is designed with multiple locations 126 A-K to accommodate one or more containers 106 that are ready to be loaded into transport vehicles 128 A-K. Each staging location 126 may correspond to a different delivery location (or destination). The staging locations 126 can be any suitable apparatus with a form factor for holding one or more containers 106. For example, the staging locations 126 can include pallets, carts, shelving units, etc. In another example, the staging locations 126 can include defined regions on the floor of the facility rather than being placed in a holding apparatus. In some examples, tape or paint may be used to define the boundaries of the staging locations 126.

The containers 106 are smart container devices that can store one or more items 132 and be used to transport the item(s) 132. In general, the container 106 can have a variety of different configurations and/or be formed from a variety of materials (e.g., metal, plastic, wood, etc.) suitable for holding and transporting one or more items 132. For example, one or more sides of the container 106 can have a surface shape that is substantially planar, crowned, domed, irregular, or any other shape or combination of shapes. In some embodiments, the container 106 may be a manual or hand-propelled transport device that can move about the facility, e.g., under the direction of an associate.

Each container 106 includes a charging system 134, one or more electronic devices 136, one or more identification markers 138, and a network interface 140. The charging system 134 enables the container 106 to (re)-charge the electronic device(s) 136 disposed on the container 106 as the container 106 is manually moved throughout the facility or outside the facility (e.g., during the delivery process). For example, in some embodiments, a container 106 may include a set of wheels that allow the container 106 to be pushed, pulled, or moved in any direction. The wheels can include, but are not limited to, swivel caster wheels, rotary wheels, omni-directional ("omni") wheels, etc. A container 106 can include any number of wheels (e.g., one, two, three, four, etc.). In these embodiments, the wheels of the container 106 along with a battery and motor may be part of the charging system 134.

The electronic devices 136 are representative of a variety of electronic devices, which can be used to aid management of operations in the inventory system 100. Examples of such devices 136 can include, but are not limited to, smart (wireless) controllers, light devices (e.g., light emitting diodes (LEDs)), RFID tags, RFID readers, near field communication (NFC) devices, electronic displays, Bluetooth modules, etc. In one embodiment, the smart controller can be used to control other electronic devices 136 on the container 106. For example, the smart controller can receive commands from the management system 110 to turn on/off electronic devices, exchange data with the management system 110, and the like. The electronic devices 136 are described in more detail below with respect to FIG. 2.

The identification marker(s) 138 on the container 106 provide an additional layer of monitoring/tracking that can be used by the facility to locate a given container 106. For example, in situations where the container 106 cannot be monitored via one of the electronic devices 136, the management system 110 can locate the container via the identification marker(s) 138. Note, however, that the management system 110 can use the identification marker(s) 138 to locate the container 106 in other situations or circumstances. For example, the management system 110 may be able to determine that the container 106 is present in the facility based on an indication received from an RFID tag on the container 106 and can determine the position (e.g., X, Y, Z coordinates) of the container 106 based on the identification marker(s) 138. In one embodiment, the identification marker(s) 138 may be placed on a location of the container 106 that is readily visible to camera devices utilized by the management system 110. The network interface 140, in general, may be any type of network communications interface that allows the electronic devices 136 to communicate with electronic devices on other containers 106, computers, and/or components in the inventory system 100 via one or more data communication networks.

Figure 2:
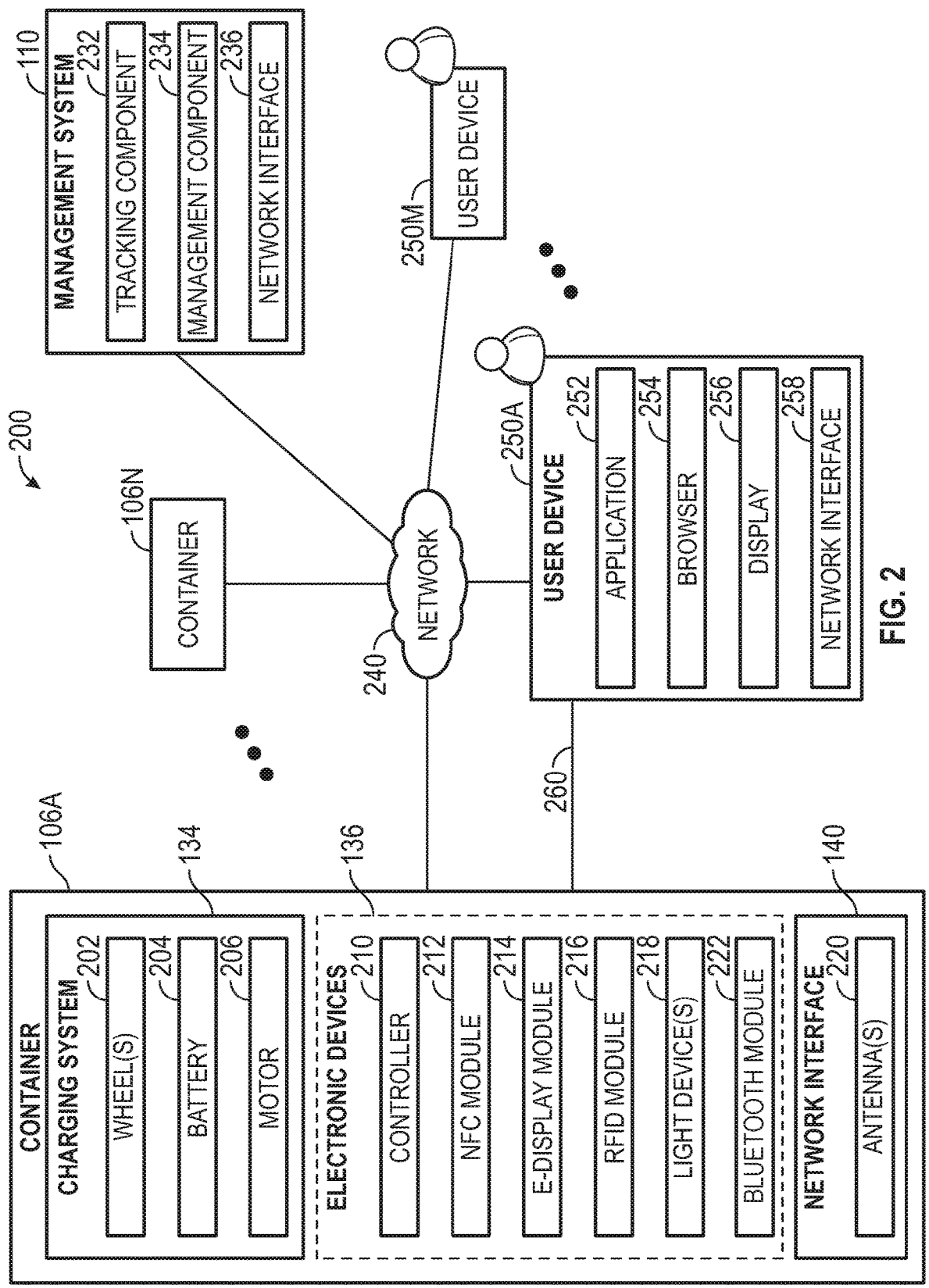
FIG. 2 is a block diagram illustrating an example network architecture for a real-time container tracking system, according to one embodiment.

FIG. 2 is a block diagram of an example network architecture 200 for a real-time container tracking system, according to one embodiment. The network architecture 200 includes a management system 110, one or more containers 106 A-N, and one or more user devices 250 A-M, which are interconnected via a network 240. The management system 110 and the user devices 250 A-M are representative of a variety of computing devices (or systems), including a laptop computer, mobile computer (e.g., a tablet or a smartphone), server, etc. In one embodiment, one or more components of the management system 110 may be distributed across multiple computing systems in a cloud computing environment. The network 240, in general, may be a wide area network (WAN), a local area network (LAN) (e.g., Ethernet), a wireless LAN, a personal area network (PAN), a cellular network, etc. In a particular environment, the network 240 is the Internet.

Each container 106 includes the charging system 134, electronic devices 136, and the network interface 140. The charging system 134 includes one or more wheels 202, one or more batteries (also referred to as battery packs) 204, and one or more motors 206. As noted, in some embodiments, the wheel(s) 202 enable the container 106 to move in all directions (e.g., forwards, backwards, laterally). Each wheel 202 may be coupled to a motor 206. In one embodiment, the motor 206 can be configured to operate as a generator, e.g., by driving or rotating the shaft of the motor 206 via the wheel 202. When operated as a generator, the motor 206 converts the mechanical energy of the driven shaft into electrical energy, which is used to charge the batteries 204.

Although not shown, in some embodiments, the charging system 134 can also include a regulator, which can be used to control (e.g., regulate) the output voltage and polarity of the motor 206, e.g., as the wheel 202 rotates in different (forward/backwards) directions. One example of the regulator is an AC/DC to DC converter. In this manner, the charging system 134 can use the motion of the container 106 to recharge batteries 204 for one or more of the electronic devices 136.

The electronic devices 136 include a (smart) wireless controller 210, an NFC module 212, an electronic display (E-Display) module 214, a RFID module 216, light device(s) 218, and a Bluetooth module 222. The controller 210 generally provides an interface for controlling one or more of the NFC module 212, E-Display module 214, RFID module 216, light device(s) 218, and Bluetooth module 222. For example, the controller 210 may receive commands from the management system 110 that turn on/off or otherwise change operation of one or more of the electronic devices 136.

The controller 210 may communicate with the management system 110 via the network interface 140. Here, the network interface 140 includes one or more antennas 220 that provide wireless communication between the electronic device(s) 136 and the management system 110 and/or between the electronic device(s) 136 and other electronic device(s) 136 on other container(s) 106. In general, the network interface 140 can provide communication using a variety of wireless technologies/protocols (e.g., Bluetooth, WiFi, cellular communications) and on one or more frequencies (e.g., 900 MHz, 2.4 GHz, etc.). In one embodiment, at least one of the antenna(s) 220 is a Bluetooth antenna (e.g., 2.4 GHz Bluetooth antenna). In some embodiments, the antenna(s) 220 may also provide an indication of the location of the container 106 in real-time to the management system 110. This allows the management system 110 to track the container 106 (and associated contents) whether the container 106 is inside the facility or outside the facility. In some embodiments, the antenna(s) 220 can also be used to track container(s) 106 leaving from and arriving to the facility.

The NFC module 212 allows users (or associates) to quickly determine information associated with a container 106, e.g., without manually looking into the container 106. For example, in one embodiment, a user can bring their user device 250 in close proximity with the NFC module 212 to obtain container details, such as the number of items within the container, the container ID, the shipment ID, loading sequence, etc. The NFC module 212 can communicate with the user device 250 via communication link 260. For example, in one embodiment, the communication link 260 may support one or more NFC communication protocols. In addition to providing container information to a user, the NFC module 212 can provide information associated with the container 106 to the management system 110, e.g., via the controller 210. Such information can include, for example, a user ID, container history (e.g., a list of users that have interacted with the container 106 within a predetermined time period, timestamps of those interactions, etc.), a timestamp indicating the last time the container 106 was interacted with (e.g. scanned), and the like. With this information, the management system 110 can significantly improve the visibility and traceability of containers 106 used in facility operations.

The Bluetooth module 222 provides another communication interface, which the container 106 can use to communicate information associated with the container. For example, users in proximity to the container 106 (e.g., within the range supported by the Bluetooth communication protocol) can establish a Bluetooth communication link (e.g., communication link 260) with the container 106 to exchange information associated with the container (e.g., status updates, container history, etc.), update software of the controller 210, change information on the E-Display module 214, etc.

The E-Display module 214 can display scannable content (e.g., a barcode) and/or other container information for a user. For example, the E-Display module 214 can display information, such as the container ID, container loading sequence, route ID, user ID, driver ID, etc. In some embodiments, the E-Display module 214 can be used to display error messages and/or special handling instructions to a user. In some embodiments, the information provided by the E-Display module 214 can be updated in real-time, e.g., via the management system 110. In this manner, a given container 106 can be updated in real-time, based on its current status.

The RFID module 216 can include an RFID tag and/or a RFID reader. In the case of an RFID tag, the RFID tag can be disposed on (or within) the container 106 and used to virtually process (e.g., receive, induct, outbound processes, etc.) the container 106 and its contents. In some cases, one or more RFID readers may be disposed throughout the facility to read the container RFID tags as they are processed. In some cases, one or more RFID readers can be disposed within transport vehicles (e.g., transport vehicles 128) to read container RFID tags. The management system 110 can receive an indication each time that an RFID tag on a container is read/detected by an RFID reader and determine a status of the container (e.g., container is within facility, container is in a transport vehicle, etc.) based on the indication. Each RFID tag may be associated with a unique identification number. In the case of an RFID reader, the RFID reader can be disposed on (or within) the container 106 and can be used to track the container's contents, assuming each item within the container 106 includes an RFID tag. In this case, the management system 110 can receive information indicating at least one of a number of items within the container, which items are within the container, and the like.

The light device(s) 218 are generally used as a location guidance tool to aid users in locating particular containers 106. In one embodiment, the light device(s) 218 are LEDs. Some containers 106, for example, may be high priority containers. For example, a container may be considered a high priority container if it is associated with a customer order due to be shipped within a first threshold amount of time. In another example, a container may be considered a medium priority container if it is associated with a customer order due to be shipped within a second threshold amount of time. In yet another example, a container may be considered a low priority container if it is associated with a customer order due to be shipped within a third threshold amount of time. In some embodiments, the priority of the container may be associated with the amount of time a container has remained in a particular state and/or location. For example, a container may be considered high priority if it has been dwelling in a given location for a predetermined amount of time or a state of the container (e.g., container has not been processed, scanned, etc.) is unchanged for a predetermined amount of time.

Thus, in general, the light device(s) 218 may be illuminated to show priority of the container 106. The container 106 can include multiple sets of light device(s), each set associated with a particular priority and/or a state of the container 106. For example, a set of red light devices (e.g., red LEDs) may be associated with high priority containers, a set of yellow light devices (e.g., yellow LEDs) may be associated with medium priority containers, a set of green light devices (e.g., green LEDs) may be associated with low priority containers, and so on. In addition to illuminating colors, the light devices 218 can be controlled to illuminate with different patterns to communicate various states. For example, a blinking red container may indicate that the container is high priority and that the container should be processed within a time threshold. On other hand, a blinking green container may indicate that the container is next in the queue to be processed by a given user, indicating that the container is low priority.

The management system 110 includes a tracking component 232, a management component 234, and a network interface 236. Although not shown, the management system 110 may include processor(s), memory (e.g., volatile, non-volatile, etc.), storage, etc. The storage may be a combination of a fixed and/or removable storage, such as fixed disc drives, removable memory cards, optical storage, network attached storage (NAS), or storage-area-network (SAN). The network interface 236 may be any type of network communications interface that allows the management system 110 to communicate with containers 106, user devices 25, other computers and/or components in the network architecture 200 via a data communications network (e.g., network 240). The memory may include the tracking component 232 and the management component 234, each of which can include hardware and/or software components.

The tracking component 232 is configured to receive data from one or more electronic devices 136 on a container 106, and determine a location (or position) of the container 106, based on the data. As an example, the tracking component 232 can receive an indication that a RFID reader (located in storage region 102, a transport vehicle 128, or elsewhere within or outside a facility) detected the RFID tag from the RFID module 216 disposed on a container 106. As another example, the tracking component 232 may monitor the real-time location of the container 106 from information received via the antenna(s) 220. In some embodiments, the tracking component 232 may interact with or employ a camera vision system to determine the location of the container 106. For example, the tracking component 232 can use the camera vision system to identify and read one or more identification markers 138 located on the container 106.

The management component 234 is generally configured to control operation of the electronic devices 136 and/or operations in the facility, based in part, on data obtained via the electronic devices 136. For example, in some embodiments, the management component 234 can send commands to turn on/off various sets of lighting devices 218 on a given container 106 to aid a user in identifying the location of the container 106. In some embodiments, the management component 234 can update information provided on the E-Display module 214 located on a given container 106. For example, the management component 234 can send notifications, alarms, error messages, change the loading sequence, etc.

In some embodiments, the management component 234 can be configured to provide information associated with the containers to one or more users, via user devices 250 A-M. For example, the user device 250 is generally configured to host applications used to access the management system 110. Here, for example, the user device 250A includes an application 252, a (web) browser 254, a display 256, and a network interface 258. The network interface 258 may be any type of network communications interface that allows the user device 250A to communicate with other containers 106, user devices 250, computers and/or components in the network architecture 200 via a data communications network (e.g., network 240) and/or communication link 260, etc.

The application 252 is representative of a component of a client server application (or other distributed application) which can communicate with the management system 110 over the network 240. Application 252 may be a "thin" client where the processing is largely directed by the application 252, but performed by components (e.g., tracking component 232, management component 234) of the management system 110, or a conventional software application installed on the user device 250A. The browser 254 may be used to access components (e.g., tracking component 232, management component 234) of the management system 110 by rendering web pages received from the components.

In one embodiment, the tracking component 232 and/or the management component 234 may be modeled as a service back-end (e.g., web server, application server, and database), and the application 252 and/or the browser 254 may be modeled as a service front-end. Of course, other software architectures or distributed application frameworks could be used. For example, in general, the tracking component 232 and/or the management component 234 may be implemented using any suitable software programming language, application framework, web service solution stack, virtual application containers, etc., in order to present container management application features and content to a user. In some examples, the management component 234 and/or the tracking component 232 may respond to requests from users by generating hypertext markup language (HTML) and related content that can be passed to users and rendered as a user interface (e.g., on display 256). The content may include, for example, HTML components, code that generates HTML components, instructions executable by the user device 250 to display the user interface (e.g., using language-specific or operating systems-specific application content), etc. In some cases, the application 252 and/or the browser 254 could generate information (or application) content to present data retrieved from the management component 234 and/or the tracking component 232.

A user can access the management component 234 and/or the tracking component 232, e.g., via the application 252 and/or the browser 254 on user device 250. In one embodiment, the tracking component 232 may provide an indication of the location of a given container 106 on the user interface to aid the user in locating the container 106. The indication can be provided via geographical coordinates (X, Y, Z), via a marker (or indicator) on a geographical map, etc. In one embodiment, the management component 243 may enable a user to change/update a status of a given container 106, change a destination location of the container (e.g., by changing the shipment ID), change the loading sequence, etc.

Figure 3A:
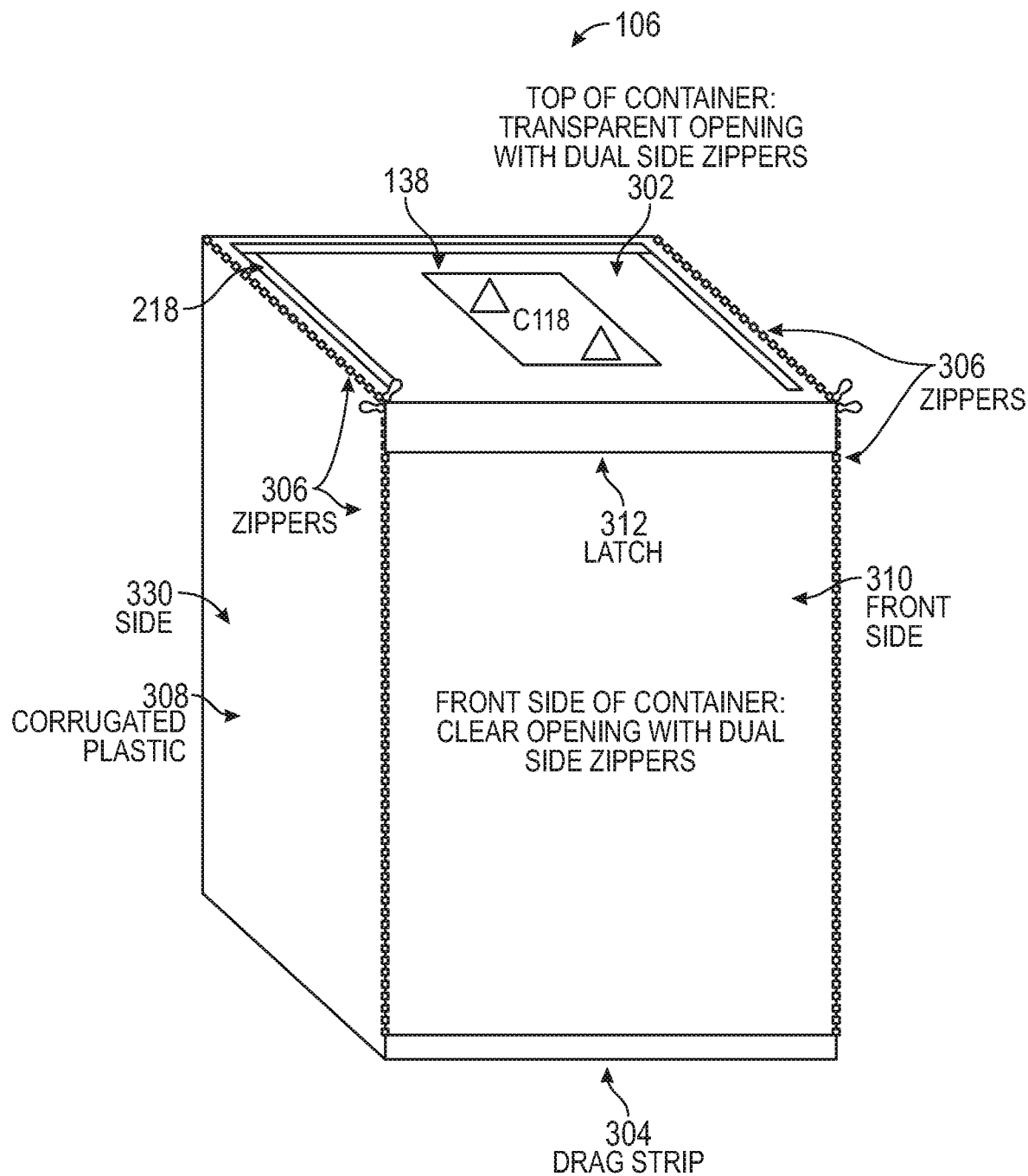
FIG. 3A illustrates a front perspective view of a container, according to one embodiment.
Figure 3B:
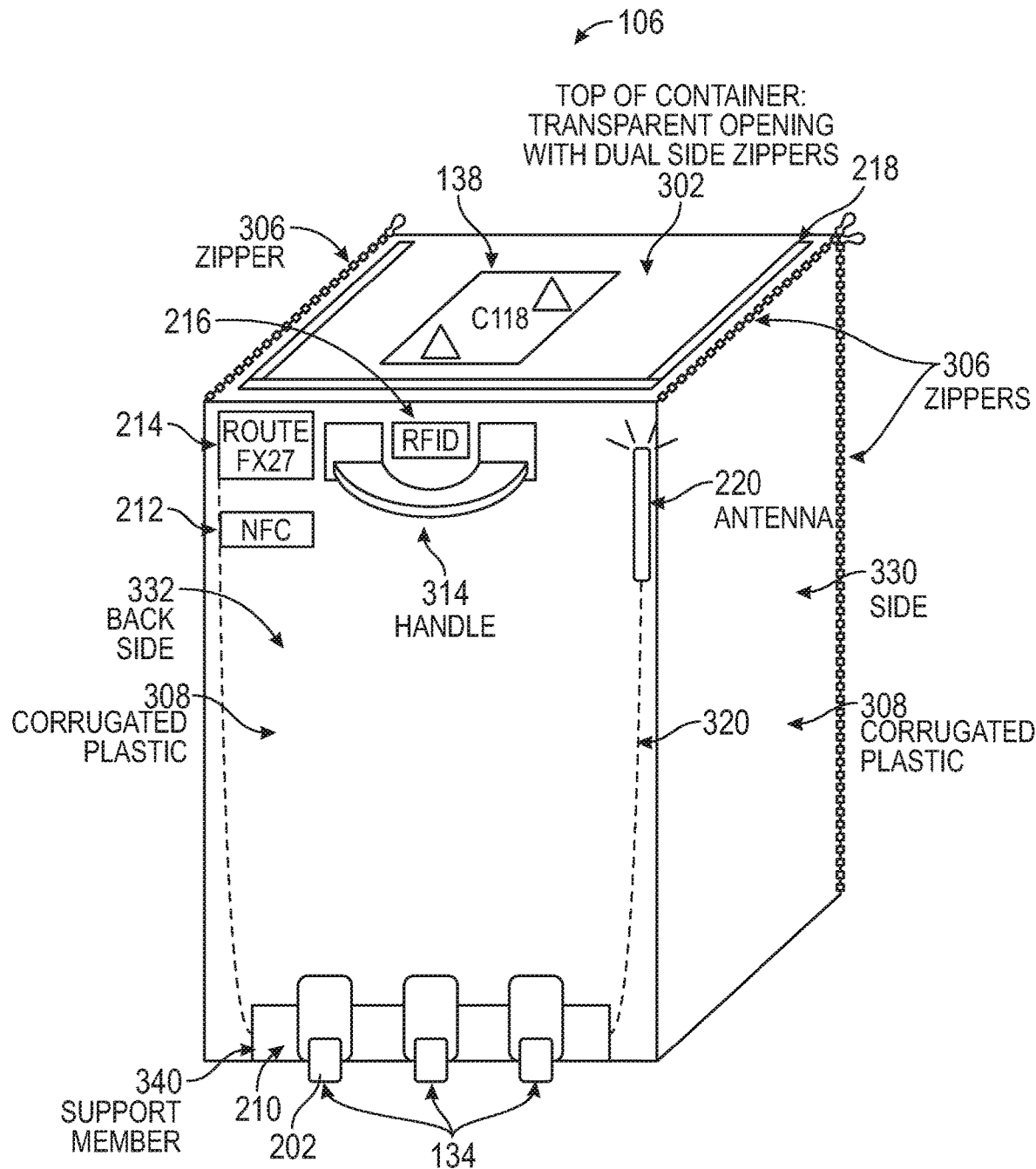
FIG. 3B illustrates a back perspective view of a container, according to one embodiment.
Figure 3C:
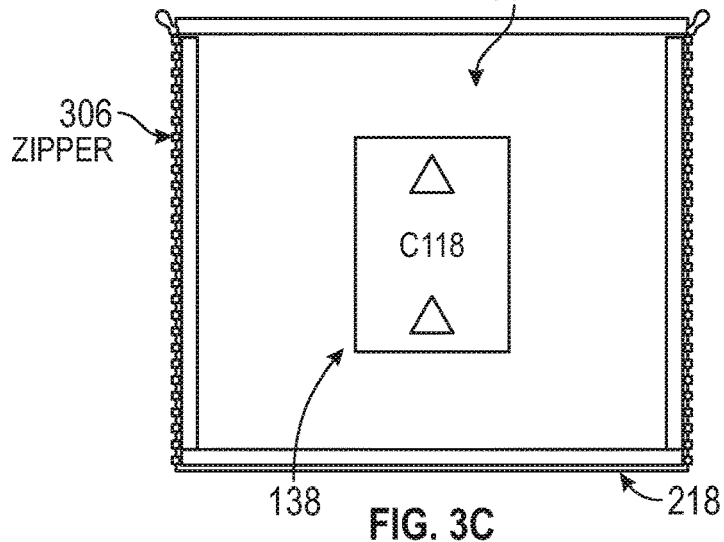
FIG. 3C illustrates a top view of a container, according to one embodiment.
Figure 3D:
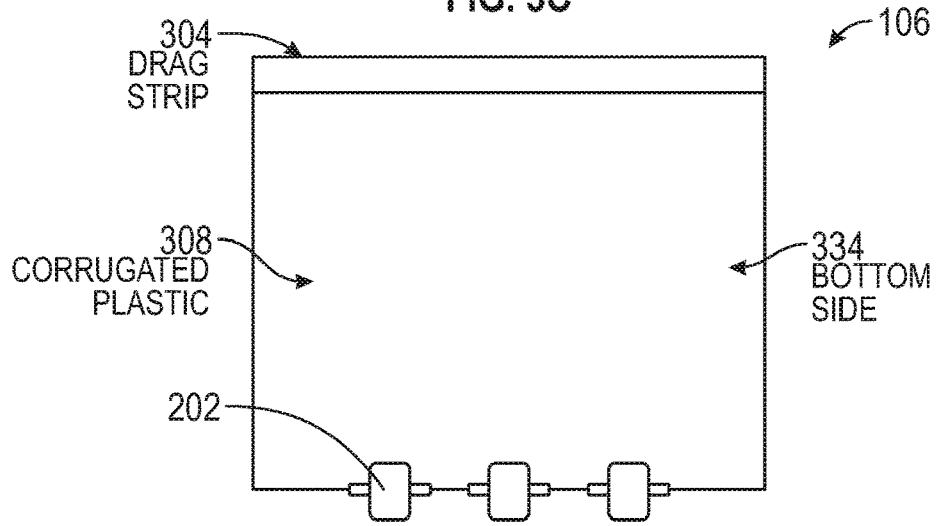
FIG. 3D illustrates a bottom view of a container, according to one embodiment.
Figure 3E:
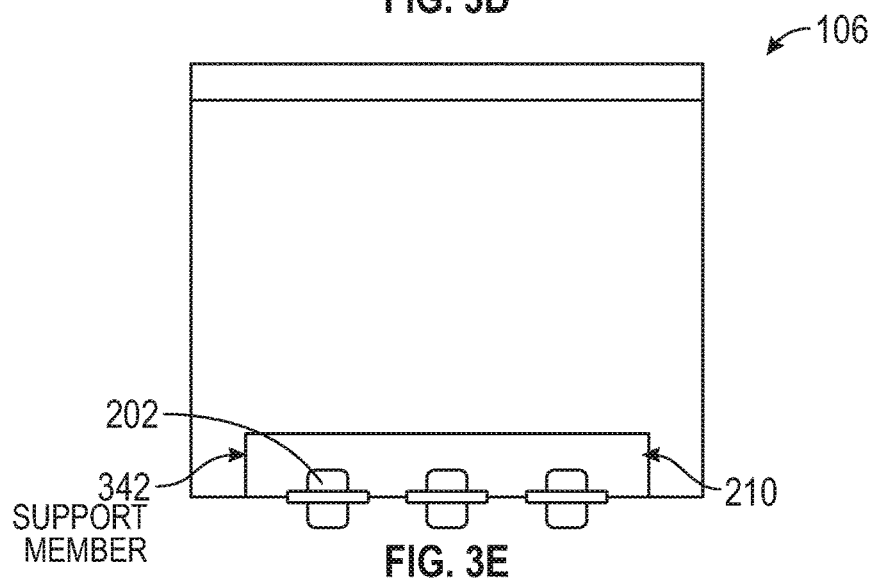
FIG. 3E illustrates a top down view of the inside of a container, according to one embodiment.

FIGS. 3A-3E illustrate different views of an example smart container 106, according to one embodiment. In particular, FIG. 3A shows a front perspective view of the container 106, FIG. 3B shows a back perspective view of the container 106, FIG. 3C shows a top view of the container 106, FIG. 3D shows a bottom view of the container 106, and FIG. 3E shows a top down view of the inside of the container 106.

In this particular embodiment, the top side 302 of the container 106 is a transparent material with dual side zippers 306 located on opposite edges of the top side 302 (e.g., as shown in FIGS. 3A, 3B, and 3C). The container 106 includes an identification marker 138, which is disposed on the top side 302 (e.g., as shown in FIGS. 3A, 3B, and 3C). The top side 302 of the container also includes one or more sets of light devices 218 disposed along three edges of the top side 302.

Referring back to FIG. 3A, the front side 310 of the container 106 is formed from a transparent material with dual side zippers 305 located on opposite edges of the front side 310. A latch 312, which can be used to secure the transparent material on the top side 302 to the container 106, is disposed proximate to a top edge of the front side 310 of the container 106. In one embodiment, the latch 312 can be formed from an adhesive material, a fastener (e.g., Velcro @), or any other suitable material.

The container 106 includes a drag strip 304 which is located proximate the bottom edge of the front side 310 of the container 106 (e.g., as shown in FIG. 3A). The drag strip 304 is generally used to protect the front side 310 bottom edge from wear and tear caused due to repeated handling of the container 106. The (left and right) sides 330 of the container may be formed from corrugated plastic 308. However, note that this is merely an example of a type of material that can be used for the sides of the container 106. In one embodiment, for example, the inner sides of the container 106 may be formed from a plastic material (e.g., corrugated plastic 308) and a covering formed from another material (e.g., cloth, nylon, etc.) may be disposed on top of the plastic material.

Referring to FIG. 3B, the back side 332 of the container 106 may be formed from corrugated plastic and include one or more electronic devices 136 mounted (or otherwise attached) to the corrugated plastic 308. As shown, for example, the NFC module 212, the RFID module 216, the E-Display module 214, and the antenna 220 may be attached to the back side 332 of the container 106. Note, however, that FIG. 3 depicts merely a reference example of where the electronic devices 136 can be located on the container 106. In other embodiments, one or more electronic devices 136 may be disposed on other sides of the container 106. Similarly, the zippers 306, identification marker 138, handle 314, etc., can be disposed on other sides of the container 106.

Support members 340 and 342 are used to provide a support structure for the charging system 134 and controller 210. The support member 340 is disposed along a bottom edge of the (inner portion) of the back side 332 (e.g., as shown in FIG. 3B) and the support member 342 is disposed along the same edge on the (inner portion) of the bottom side 334 of the container 106. In one embodiment, the support members 340 and 342 may be formed from a plastic material or other suitable material. The wheel(s) 202, battery 204, and controller 210 may be attached to the support structure formed by the support members 340 and 342. The E-Display module 214, NFC module 212, smart controller 210, and antenna 220 may be interconnected via wiring interface 320.

Figure 4:
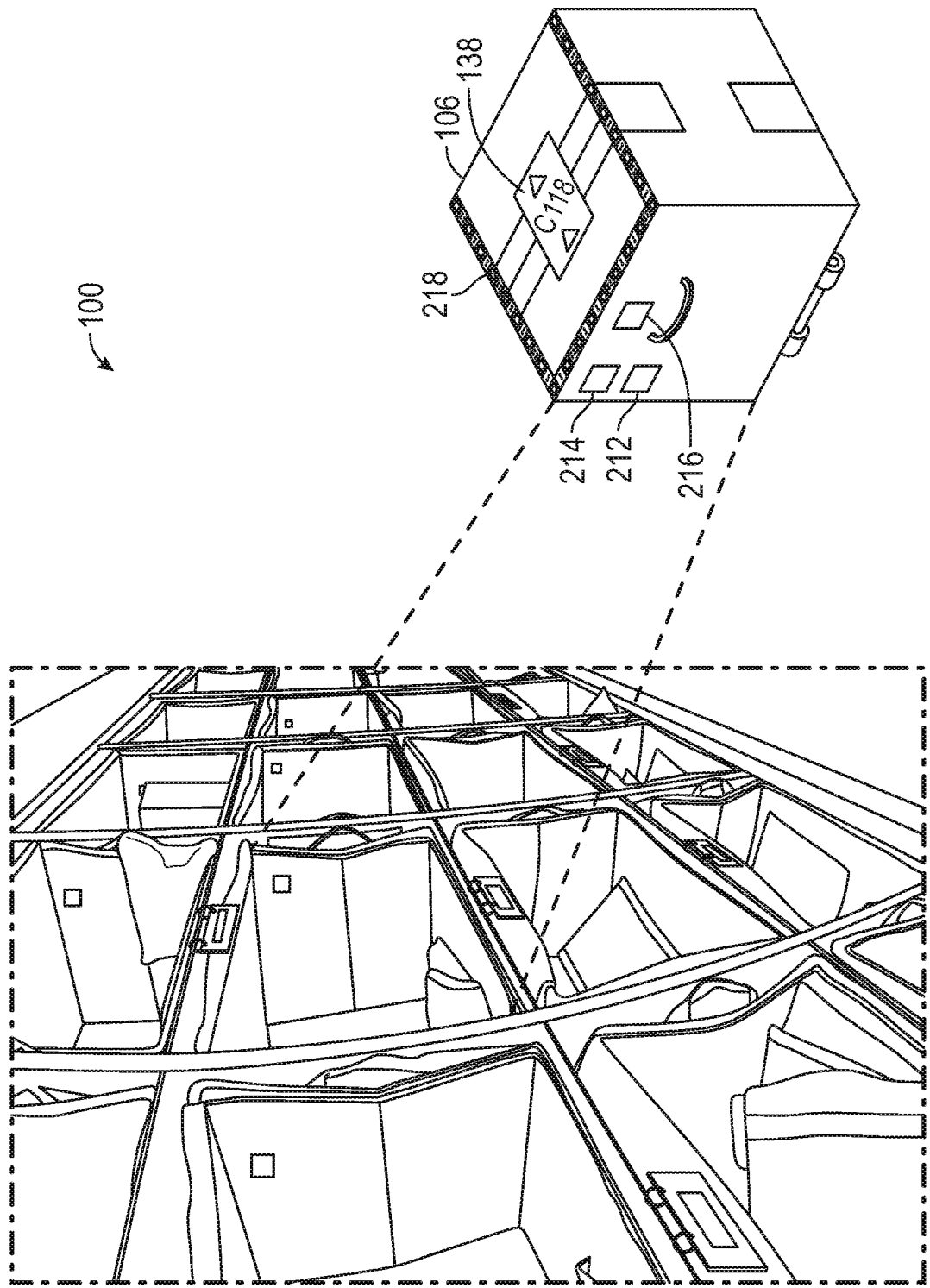
FIG. 4 depicts a reference example of a region in a facility with one or more containers, according to one embodiment.

FIG. 4 depicts a reference example of a region in a facility with one or more containers, according to one embodiment. In this particular example, the region may be a storage region (e.g., storage region 102) of a facility. As shown, the region may include multiple inventory holders in the form of multiple racks of shelves, where each shelf holds a container 106. Note that the container shape shown in FIG. 4 is provided as a reference example and that the container 106 can have a variety of different configurations and/or be formed from a variety of materials suitable for holding one or more items. Additionally, in some embodiments, the container 106 may have a collapsible structure, such that the container 106 occupies a small amount of space when it is empty. For example, assuming the container 106 has the cubic shape depicted in FIG. 4, one or more sides of the container 106 may be collapsible to reduce the size of the container 106.

Figure 5:
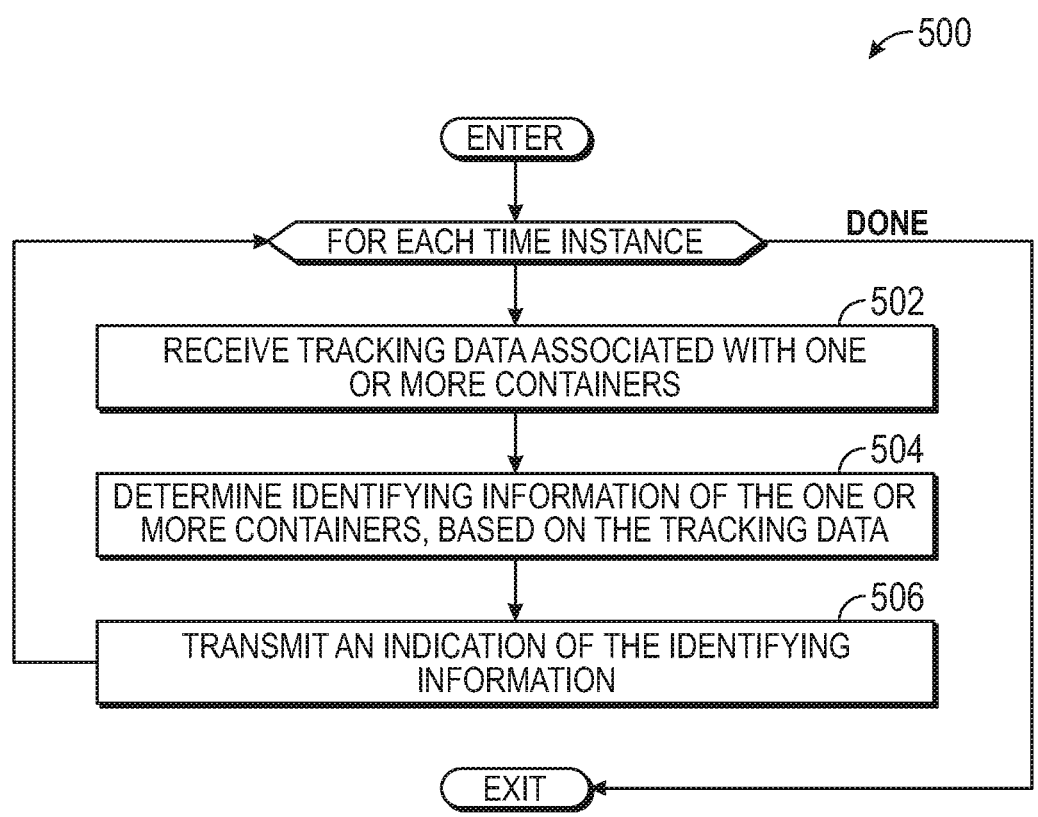
FIG. 5 is a flowchart of a method for tracking container(s) in an environment, according to one embodiment.

FIG. 5 is a flowchart of a method 500 for tracking container(s) in an environment, according to one embodiment. The method 500 may be performed by a management (or control) system (e.g., management system 110). The method 500 may be performed for each predetermined time instance of multiple time instances, e.g., within a predetermined time period, such as 12 hours, 24 hours, etc. Flush out more examples, e.g., information from a camera system that identifies markers, data received from RFID readers, receiving locating information from antennas. Identifying information from NFC, The method 500 may enter at block 502, where the management system receives tracking data associated with one or more containers. In one embodiment, the tracking data may be received from the smart controllers (e.g., controllers 210) disposed on the containers via the antenna(s) (e.g., antenna(s) 220) disposed on the containers. Additionally, or alternatively, in another embodiment, the tracking data may be received from a camera vision system that monitors and identifies markers (e.g., identification markers 138) on the containers. In yet another embodiment, the tracking data may be received from RFID readers disposed throughout the facility and/or within transport vehicles (e.g., transport vehicles 128).

In yet another embodiment, the tracking data may be received from one or more user devices (e.g., user device 250). In this embodiment, a user device 250 may interact with one or more electronic devices (e.g., NFC module 212, Bluetooth module 222, etc.) on the container (e.g., via communication link 260) and receive the tracking data from the one or more electronic devices (e.g., via communication link 260). The user device 250 may then forward the tracking data to the management system.

At block 504, the management system determines identifying information of the one or more containers, based on the tracking data. In one embodiment, for example, the management system may determine at least one of a container ID, location, container history (e.g., list of previous users, timestamps of previous interactions), container status, shipment ID, etc., based on the tracking data. At block 506, the management system transmits an indication of the identifying information. In some cases, the management system may transmit an indication of the identifying information to one or more user devices (e.g., via application 252 or browser 254). The method 500 then exits.

Figure 6:
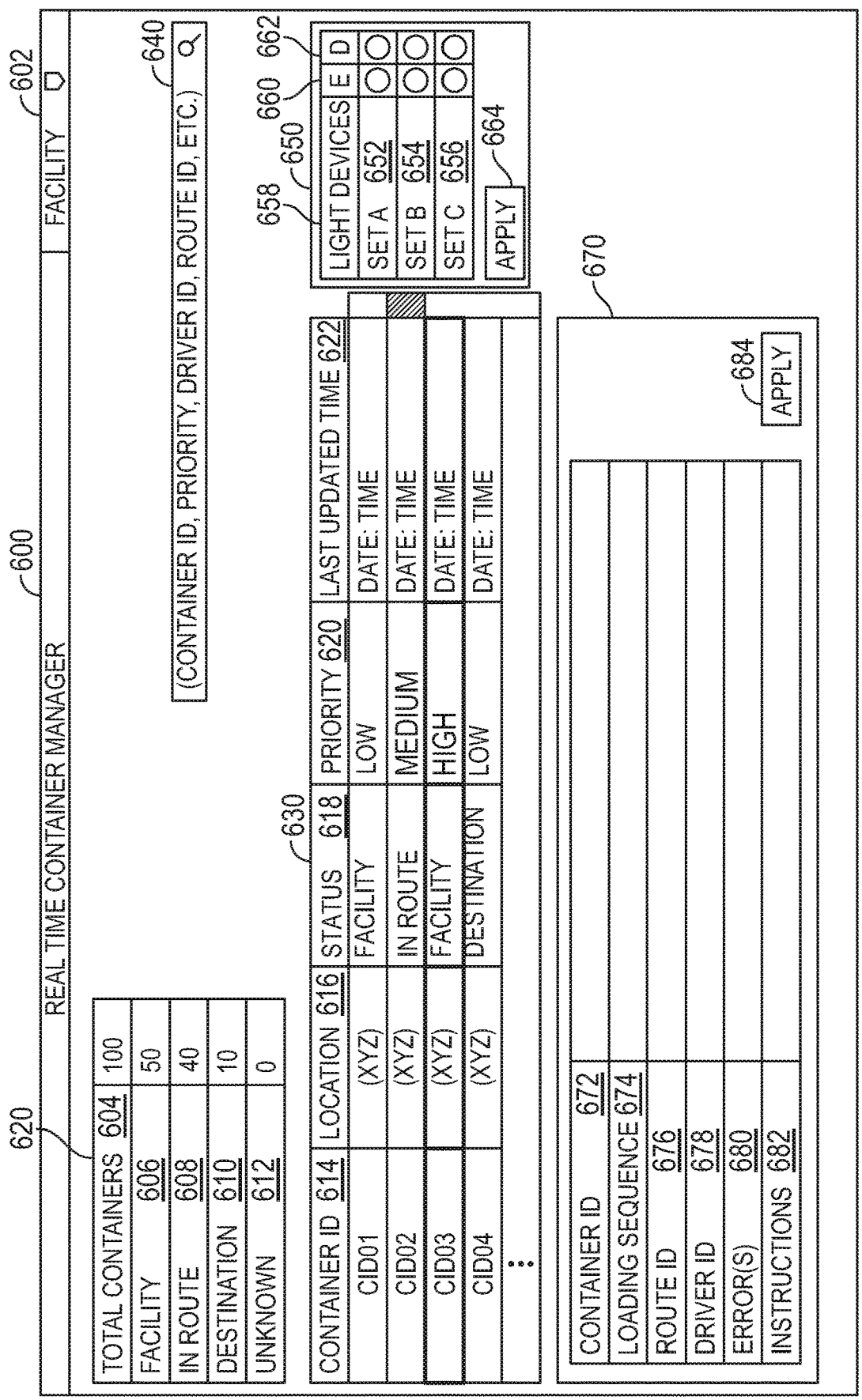
FIG. 6 depicts an example of real-time container information on a user interface, according to one embodiment.

FIG. 6 depicts an example of a real-time container manager 600 that can be provided on a user interface, according to one embodiment. In this particular embodiment, the real-time container manager 600 includes panels 602, 620, 640, 630, 670, and 650. The panel 602 enables a user to select a given facility (from multiple facilities) to manage and monitor containers 106 in that facility. The panel 620 is generally a statistics panel that includes information such as the total number of containers 604 (e.g., 100), the number of containers in the facility 606 (e.g., 50), the number of containers in route (e.g., to/from facility) 608 (e.g., 40), the number of containers at their destination 610 (e.g., 10), and the number of unknowns 612 (e.g., 0).

The panel 630 is configured to provide detailed information on each container associated with the given facility. Here, for example, the panel 630 includes a container ID field 614, a location field 616, a status field 616, a priority field 620, and a last updated time field 622. The panel 640 enables a user to search for a particular container via one or more search criteria (e.g., container ID, priority, driver ID, route ID, etc.). The results of the search in panel 640 may populate in the panel 630.

The panel 650 enables the user to control which sets of light devices on a given container are turned on (e.g., enabled) or turned off (e.g., disabled). The container that is activated within the panel 650 can be controlled/selected via the panel 640 and/or the panel 630 (e.g., by selecting one of the container IDs). As shown, the panel 650 includes a control field 652 for a first set of light devices, a control field 654 for a second set of light devices, and a control field 656 for a third set of light devices. The user can select the enable flag 660 or disable flag 662 for a given set of light devices and select the apply button 664 to apply the change.

The panel 670 is a control panel that enables the user to update identifying information of a container. The container that is activated within the panel 670 can be controlled/selected via the panel 640 and/or the panel 630 (e.g., by selecting one of the container IDs). As shown, the panel 670 includes a container ID field 672, a loading sequence field 674, a route ID field 676, a driver ID field 678, an error messages field 680, and an instructions field 682. The user can update the information in the respective fields and select the apply button 684 to apply the change(s).

Although not shown, in some embodiments, the real-time container manager 600 can enable a user to select a given container (e.g., via the panel 630 and/or via the panel 640) and provide the user with a detailed view of the container history. For example, the container history include a histogram of timestamps of when the container was scanned or identified throughout its journey, a list of users that interacted with the container, how long the container has been in use, battery status of electronic devices on the container, maintenance schedule for the container, etc.

Figure 7:
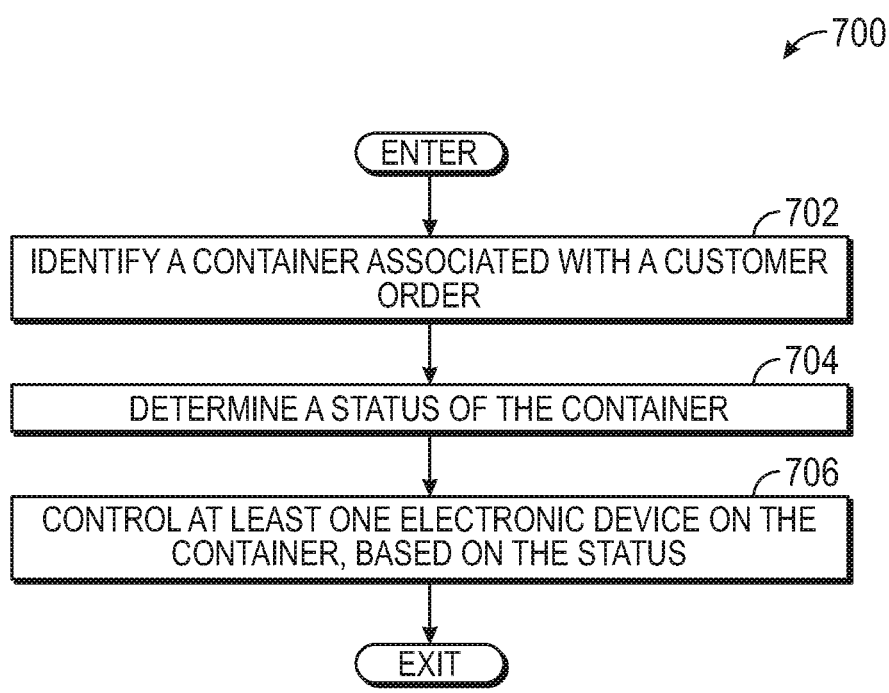
FIG. 7 is a flowchart of a method for controlling devices on a container, according to one embodiment.

FIG. 7 is a flowchart of a method 700 for controlling devices on a container, according to one embodiment. The method 700 may be performed by a management (or control) system (e.g., management system 110).

The method 700 may enter at block 702, where the management system identifies a container (e.g., container 106) associated with a customer order. At block 704, the management system determines a status of the container. The status can include, for example, a location of the container, a priority of the container, whether the container is misplaced, whether the container has been processed (e.g., scanned), whether the container has been shipped, etc. In one embodiment, the priority of the container may be associated with a priority of a customer order that includes one or more items stored within the container. In this embodiment, the management system may determine the priority of the container based on an amount of time remaining before the customer order is due to be shipped.

At block 706, the management system controls at least one electronic device (e.g., electronic device(s) 134), based on the status of the container. For example, in one embodiment, the management system can update information on a display (e.g., E-Display module 214) on the container, based on the status. In another embodiment, the management system may illuminate, turn off, or change an illumination pattern of a set of lighting devices on the container, based on the status. For example, the management system may illuminate the subset of lighting devices to indicate the priority of the container (associated with a customer order). In another example, the management system may turn of the subset of lighting devices after determining that the container (associated with the customer order) has been shipped (e.g., the management system may receive an indication from an RFID reader deployed in a transport vehicle that the RFID tag on the container has been detected).

In one embodiment, the management system may modify at least one information item (e.g., container ID, shipment ID, container loading sequence, driver ID, etc.) on an electronic display (e.g., E-Display module 214) of the container, based on the status. For example, the management system can modify one or more information items in response to receiving an indication that a user has interacted with the container (e.g., via the NFC module 212, Bluetooth module 222, etc.). The method 700 then exits.

Figure 8:
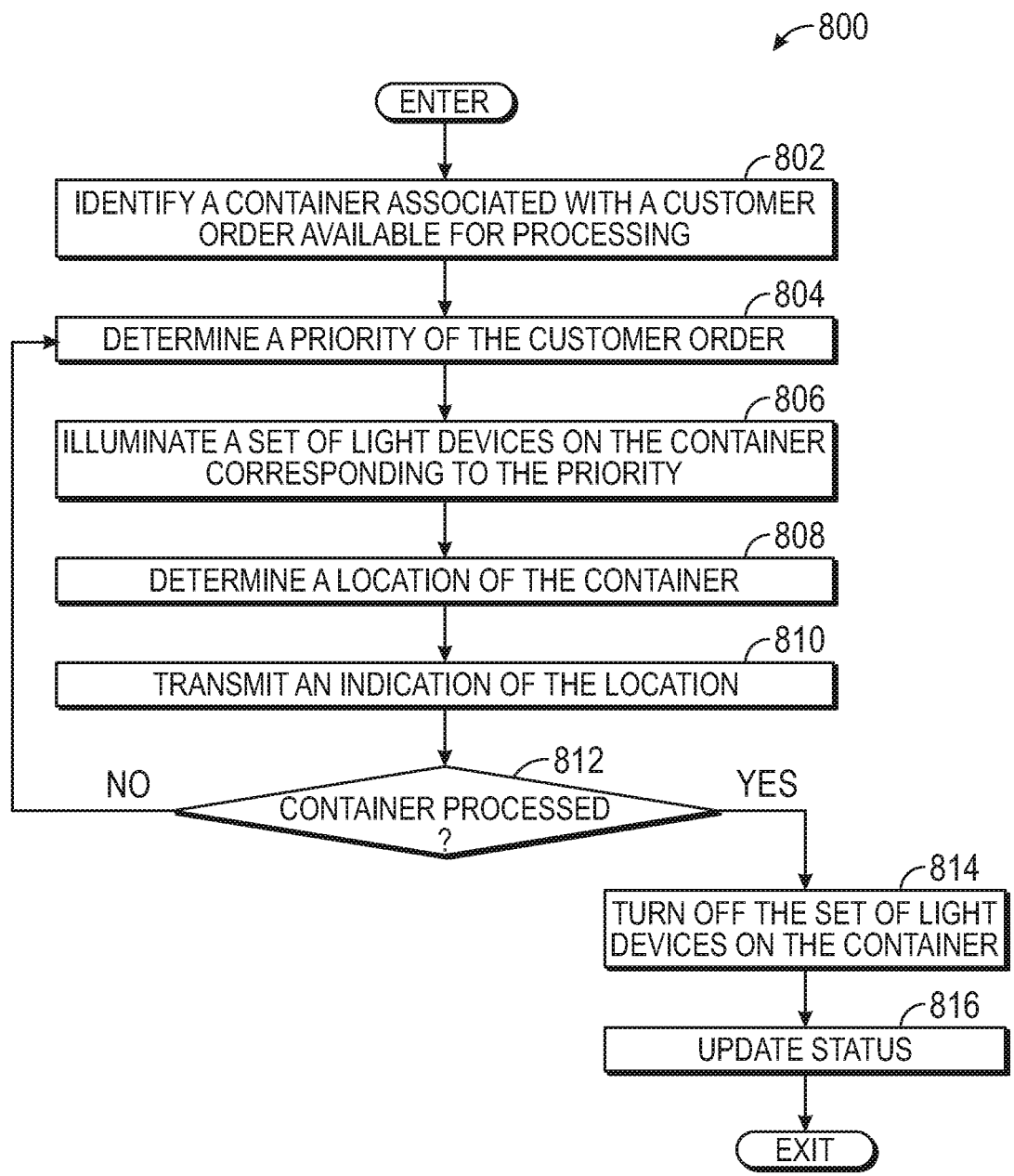
FIG. 8 is a flowchart of a method for facilitating a search for a container, according to one embodiment.

FIG. 8 is a flowchart of a method 800 for facilitating a search for a container, according to one embodiment. The method 800 may be performed by a management (or control) system (e.g., management system 110).

The method 800 may enter at block 802, where the management system identifies a container (e.g., container 106) associated with a customer order available for processing. At block 804, the management system determines a priority of the customer order. At block 806, the management system illuminates (e.g., turns on) a set of light devices (e.g., light devices 218) on the container corresponding to the priority.

At block 808, the management system determines a location of the container. The management system can determine the location of the container (e.g., via a camera vision system, RFID reader in the facility, electronic devices 136, etc.). In one particular embodiment, the management system can determine the location of the container based on a signal received from an antenna (e.g., antenna 220) coupled to a controller (e.g., controller 210) on the container.

At block 812, the management system determines whether the container has been processed (e.g., whether there has been any interaction with the container, whether items have been removed or unloaded from the container, etc.). In one embodiment, the management system can determine whether the container has been processed based on information received from an RFID reader. For example, the RFID reader can send an indication to the management system upon detecting the RFID tag. In one embodiment, the management system can determine whether the container has been processed based on information received from a user device (e.g., user device 250). For example, the user device may send an indication to the management system when interacting with a container via the NFC module 212, Bluetooth module 222, etc.

If the management system determines the container has not been processed, the management system proceeds to block 804. On the other hand, if the management system determines that the container has been processed, the management system turns off the set of light devices on the container (block 814). The management system then updates a status of the container (e.g., in a database) (block 816). The method 800 then exits.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An inventory system, comprising:
 a plurality of containers for storing and transporting items, wherein at least one container of the plurality of containers comprises:
  an electronic display disposed on the container and configured to display identifying information associated with the container;
  a radio frequency identification (RFID) tag disposed on the container and configured to provide the identifying information associated with the container;
  a plurality of light emitting diodes (LEDs) disposed on the container;
  a near field communication (NFC) device configured to exchange the identifying information associated with the container with a computing device via NFC;
  a controller disposed on the container and configured to control operation of the electronic display, the NFC device, and the plurality of LEDs; and
  a wheel-based charging system coupled to the container and configured to charge one or more battery packs for the electronic display, the plurality of LEDs, the NFC device, and the controller, as the container is moved throughout an environment; and
 a computing system configured to:
  determine a processing status of the at least one container, based at least in part on the identifying information associated with the container; and
  control the plurality of LEDs, via the controller, based on the processing status.

2. The inventory system of claim 1, wherein the at least one container further comprises an antenna disposed on the container and coupled to the controller.

3. The inventory system of claim 2, wherein the computing system is further configured to:
 determine a location of the container via the antenna; and
 provide an indication of the location.

4. The inventory system of claim 1, wherein the identifying information comprises at least one of a container identifier (ID), a route ID, a driver ID, and a container loading sequence.

5. The inventory system of claim 1, wherein the processing status comprises a priority of a customer order associated with the at least one container.

6. A computer-implemented method, comprising:
 identifying a container storing one or more items associated with a customer order available for processing;
 determining a status of the customer order; and
 controlling a plurality of electronic devices disposed on the container, based at least in part on the status of the customer order, wherein:
 the plurality of electronic devices comprises:
  a plurality of different sets of lighting devices, each respective different set of lighting devices being associated with a different status of the customer order; and
  an electronic display configured to display information associated with the container, the electronic display being disposed in a different location on the container than the plurality of different sets of lighting devices; and
 controlling the plurality of electronic devices comprises:
  illuminating a first set of the plurality of different sets of lighting devices when the customer order is determined to have a first status associated with the first set of the plurality of different sets of lighting devices; and
  controlling the electronic display to display at least one information item associated with the first status.

7. The computer-implemented method of claim 6, wherein:
 determining the status of the customer order comprises determining a priority of the customer order based on an amount of time remaining before the customer order is due to be shipped; and
 each of the plurality of different sets of lighting devices is associated with a different priority of the customer order.

8. The computer-implemented method of claim 6, wherein each of the plurality of different sets of lighting devices comprises a different respective set of light emitting diodes (LEDs).

9. The computer-implemented method of claim 6, wherein:
the container comprises another electronic device disposed on an inner side of the container; and
the plurality of electronic devices are further controlled based information received from the other electronic device.

10. The computer-implemented method of claim 6, wherein:
the plurality of electronic devices further comprises a radio frequency identification (RFID) tag;
determining the status of the customer order comprises determining that the container associated with the customer order has been shipped; and
determining that the container associated with the customer order has been shipped comprises receiving an indication from an RFID reader deployed in a shipping vehicle that the RFID tag has been detected.

11. The computer-implemented method of claim 6, wherein the plurality of electronic devices further comprises a near field communication (NFC) device configured to exchange information associated with the container with a computing device via NFC, the computer-implemented method further comprising receiving an indication from the NFC device that a user has interacted with the container via the computing device.

12. The computer-implemented method of claim 11, the computer-implemented method further comprising modifying at least one information item on the electronic display in response to receiving the indication from the NFC device.

13. The computer-implemented method of claim 12, wherein the information item comprises at least one of a container identifier (ID), a shipment ID, a container loading sequence, and a driver ID.

14. The computer-implemented method of claim 6, wherein the plurality of electronic devices comprises a controller and an antenna coupled to the controller, the computer-implemented method further comprising:
tracking a position of the container based at least in part via the antenna coupled to the controller; and
sending an indication of the position of the container to a computing device.

15. The computer-implemented method of claim 14, wherein:
the container further comprises one or more identification symbols disposed on a surface of the container; and
the position of the container is further tracked via the one or more identification symbols.

16. A smart container, comprising:
an apparatus configured to store and transport one or more items;
a plurality of electronic devices disposed on one or more outer sides of the apparatus, the plurality of electronic devices configured to transmit information for monitoring a status of the smart container throughout an environment and for tracking a position of the smart container throughout the environment; and
a wheel-based charging system coupled to the apparatus and configured to charge one or more battery packs for the plurality of electronic devices as the apparatus is moved throughout the environment, wherein the plurality of electronic devices comprises:
a plurality of different sets of lighting devices; and
an electronic display disposed in a different location on the one or more outer sides of the apparatus than the plurality of different sets of lighting devices.

17. The smart container of claim 16, wherein a first electronic device of the plurality of electronic devices comprises a controller configured to control an operation of at least a second electronic device of the plurality of electronic devices.

18. The smart container of claim 17, wherein the controller is coupled to an antenna and is configured to send, via the antenna, information indicating a position of the smart container to a computing system.

19. The smart container of claim 17, wherein;
the controller is further configured to provide on and off control to the plurality of different sets of lighting devices, based on commands received from a computing system.

20. The smart container of claim 16, wherein the plurality of electronic devices comprises a near field communication (NFC) device configured to exchange identifying information associated with the smart container with a computing device via NFC.

* * * * *